United States Patent Office 2,769,276
Patented Nov. 6, 1956

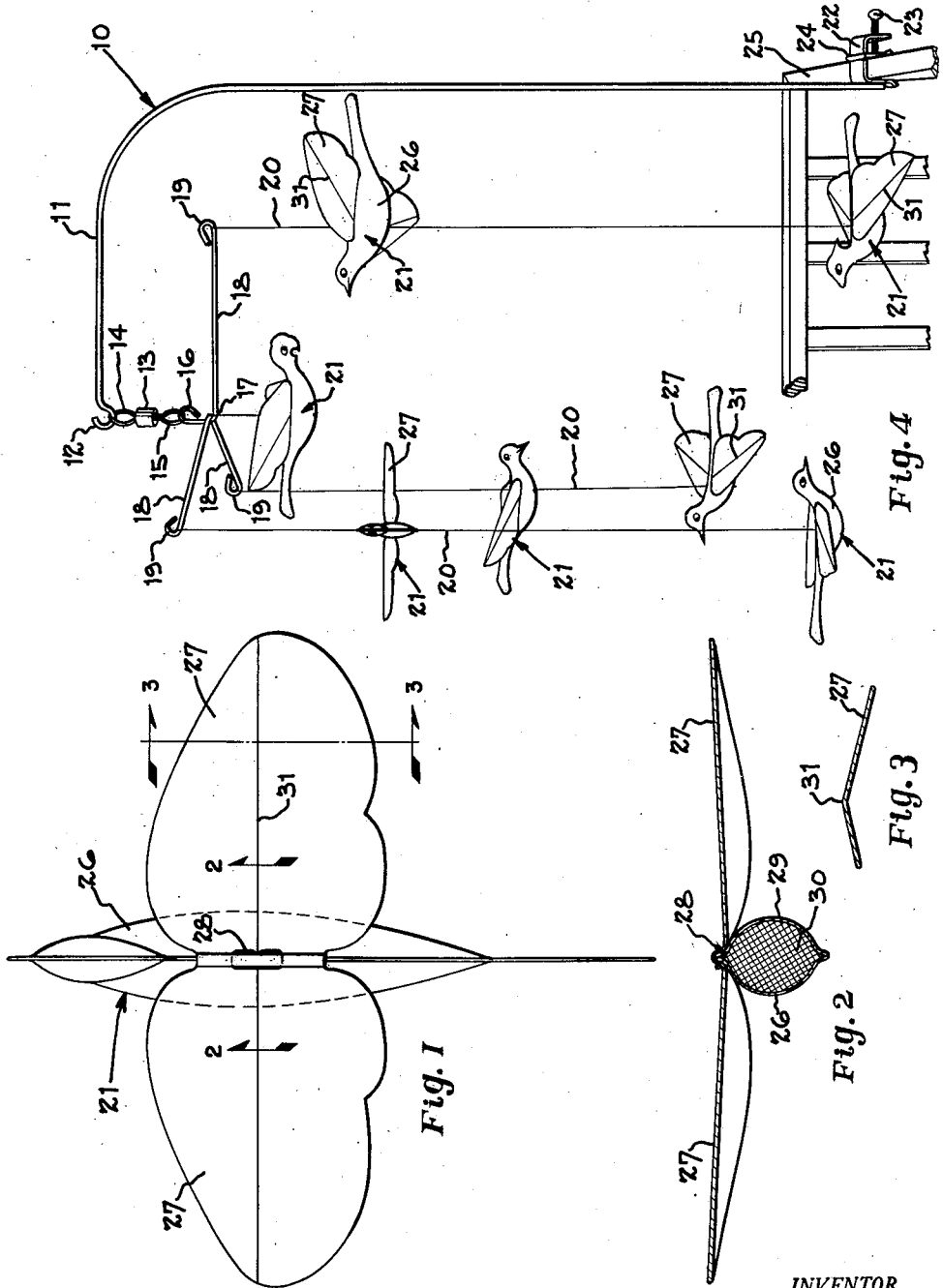

2,769,276

INFANT'S PLAYTHING

Robert L. Steiner, Cincinnati, Ohio, assignor to The Bromo-Mint Company, a corporation of Ohio Application October 19, 1953, Serial No. 386,764

1 Claim. (Cl. 46—32)

This invention relates to toys, and is concerned generally with a plaything for very small infants, particularly those of an age when they can distinguish movement and color and have at least some slight degree of physical coordination.

One of the particular objects of the invention is to provide a plaything which will attract and entertain an infant, and which has some degree of educational value, but which at the same time is completely harmless no matter how utilized.

Another object has been to provide a plaything of the general type under consideration which can be conveniently affixed to a crib, a baby's bed or a play pen, and which will entertain a child either in reclining position or when he is first able to hold himself erect.

Other and further objects and advantages will be apparent from the further and more detailed description of the invention when considered in conjunction with the drawings, in which:

Figure 1 is a top plan view of one of the birds which form the distinctive feature of the plaything.

Figure 2 is a sectional view along the line 2—2 of Figure 1.

Figure 3 is a sectional view along line 3—3 of Figure 1.

Figure 4 is an elevational view illustrating the complete device assembled and positioned on the edge of a child's bed or play pen.

Basically, the invention contemplates a plurality of relatively small artificial birds of varying types and colors suspended from a standard and mounted so as to permit movement in any direction. Preferably, the birds are mounted just out of reach of the infant where he can observe the colors and movement. If mounted within his reach the infant is apt to grasp the birds and damage them. Accordingly for slightly older children it may be desirable to mount the entire standard or the removable spider portion which supports the birds on a light fixture or some other high point which the child cannot reach. The birds are constructed of very lightweight materials and preferably have a wing construction which is adapted to catch even light drafts, thereby causing them to flutter and float around the standard in a colorful, and to an infant, an entertaining manner.

Referring again to the drawings for a further and more detailed description of the invention, as particularly illustrated in Figure 4, the principal elements include a standard 10 formed of stiff wire or similar material and curved at right angles to provide a horizontal portion 11. An attachment hook 12 is preferably formed at the extended end of the horizontal portion 11. To provide a universal movement, a swivel member 13 has an upper loop portion 14 slipped on the attachment hook and a lower loop portion 15 which removably supports the hook 16 formed centrally in the spider 17. This spider may conveniently be formed from two pieces of bent wire and preferably has three extended arms 18 as illustrated, although more or less can be provided if desired. At the end of each of these arms 18, hooks 19 are formed to which are secured threads 20 for supporting a plurality of birds 21. The construction and arrangement of these birds will be described at a later point.

At the lower end of the standard 10, a bracket 22 is secured by welding or in any other appropriate way. A set screw 23 engages the plate 24 which is journaled on the bracket 22 and urges this plate into engagement with a rail 25 of a bed or play pen in the general manner illustrated. One of the particular features of the invention is that it is readily adapted to be secured vertically, horizontally, or in almost any position desired depending on where the child is at the time.

Considering now the construction of the individual birds as particularly illustrated in Figures 1-3, these comprise essentially a body portion 26 and a pair of wings 27. The wings are preferably formed from a single sheet of cellophane, light weight plastic, or a similar material which can be bent or pinched slightly at a central point and secured to the upper surface of the body by a staple 28. The wing material should be sufficiently stiff to hold the attached wings in generally extended condition so that they will intercept air currents and flutter about in a very realistic manner. As illustrated in Figure 2 particularly, the body 26 of the bird may include an outer skin 29 formed from very light weight rubber or similar material, and an inner filling 30 of some very light weight stuffing material. The wings 27 preferably have a permanent fold line 31 extending transversely across the bird's body from one wing tip to the other. This fold provides rigidity to the wings and assists in providing a fluttering action when the birds are moved about, adding greatly to the entertainment of the infant.

The exact method of attachment of the birds 21 to the strings 20 does not constitute a feature of the invention, and in the particular construction shown, the string is simply threaded centrally through the birds' bodies. Being of very light weight, the birds which are positioned toward the upper end of any particular string will be maintained in position by friction, but if desired they can readily be moved up and down. Preferably, several birds are secured on each string.

One of the principal educational features of the invention is that the birds are preferably constructed and colored to represent real birds, such as a blue jay, bluebird, robin, canary, oriole, or the like. Through constant observation, the infant learns to identify the particular birds by color and shape, and within a short time is able to recognize the identity of real birds in their natural habitat.

The construction which is herein shown and described constitutes the preferred embodiment of the invention, but obviously various changes and modifications may be made, particularly in the exact construction of the birds, the mounting of the spider and the form of attachment bracket utilized. Accordingly, I desire to be limited only by the ensuing claim.

Having described my invention, I claim:

An infant's plaything comprising a standard including a horizontal portion and a vertical portion, a bracket at the lower end of said vertical portion adapted to be secured to the top rail of an infant's crib or the like, said vertical portion being substantially long whereby the horizontal portion overhangs the crib at a substantial height above an infant in the crib, a spider having a plurality of horizontal arms, means to freely rotatably suspend said spider from the outer end of said horizontal portion of the standard, a thread secured to the outer end of each arm of the spider and hanging freely therefrom, an additional thread secured to the center of the spider below the suspension means thereof and hanging freely therefrom, a plurality of light-weight, artificial birds, one of said birds being fastened to the thread hanging from the center of said spider, at least two artificial birds fastened onto each of the other threads, the birds being disposed at different elevations on the respective threads, each thread extending downwardly through the center of gravity of the birds upon it and the birds being distributed on the respective threads hanging from the arms of the spider such that the spider is in horizontal balance on the suspension means, and each bird having substantially large laterally extending wings made in each instance of a continuous sheet of thin plastic material, the plastic material straddling the top of the bird and being bent along a lateral line to rigidify the wing and to provide an airfoil-like wing section highly responsive to air currents, whereby air currents cause movements of the individual birds about the axes of the threads to which they are fastened and cause the assembly of birds to turn about the means freely rotatably suspending the spider from said standard to create a moving display interesting to infants.

References Cited in the file of this patent

UNITED STATES PATENTS

| | | |
|---|---|---|
| D. 152,032 | Smith | Dec. 7, 1948 |
| D. 171,594 | Hagey | Mar. 2, 1954 |
| 442,629 | Lipscomb | Dec. 16, 1890 |
| 781,104 | Slinn | Jan. 31, 1905 |
| 810,900 | Bartlett | Jan. 30, 1906 |
| 1,096,147 | Beard | May 14, 1914 |
| 1,167,502 | Huffmanet et al. | Jan. 11, 1916 |
| 1,404,894 | Rollins | Jan. 31, 1922 |
| 1,713,430 | Furman | May 14, 1929 |
| 2,005,842 | Marcus | June 25, 1935 |
| 2,092,520 | Nielson | Sept. 7, 1937 |
| 2,490,230 | Riegel | Dec. 6, 1949 |

OTHER REFERENCES

Life Magazine, Aug. 25, 1952, pages 83–90. Calder, His Gyrating Mobile Art Wins International Fame and Prizes.